US011927919B2

(12) United States Patent
Perret

(10) Patent No.: US 11,927,919 B2
(45) Date of Patent: Mar. 12, 2024

(54) TIMEPIECE ASSEMBLY WITH AT LEAST TWO ELEMENTS IN CONTACT

(71) Applicant: PATEK PHILIPPE SA GENEVE, Geneva (CH)

(72) Inventor: Julien Perret, Andilly (FR)

(73) Assignee: PATEK PHILIPPE SA GENEVE, Geneva (CH)

( * ) Notice: Subject to any disclaimer, the term of this patent is extended or adjusted under 35 U.S.C. 154(b) by 0 days.

(21) Appl. No.: 17/624,962

(22) PCT Filed: Jul. 10, 2020

(86) PCT No.: PCT/IB2020/056500
§ 371 (c)(1),
(2) Date: Jan. 5, 2022

(87) PCT Pub. No.: WO2021/005564
PCT Pub. Date: Jan. 14, 2021

(65) Prior Publication Data

US 2022/0260955 A1 Aug. 18, 2022

(30) Foreign Application Priority Data

Jul. 10, 2019 (EP) .................................... 19185385

(51) Int. Cl.

| | |
|---|---|
| ***G04B 31/08*** | (2006.01) |
| ***C10M 105/76*** | (2006.01) |
| ***C10N 30/06*** | (2006.01) |
| ***C10N 40/06*** | (2006.01) |
| ***C10N 50/00*** | (2006.01) |
| ***G04B 15/14*** | (2006.01) |

(52) U.S. Cl.
CPC ........... *G04B 31/08* (2013.01); *C10M 105/76* (2013.01); *G04B 15/14* (2013.01);
(Continued)

(58) Field of Classification Search
CPC ............ C10M 105/76; C10M 2227/04; C10N 2030/06; C10N 2040/06; C10N 2050/023; G04B 15/13; G04B 31/08
See application file for complete search history.

(56) References Cited

U.S. PATENT DOCUMENTS

2005/0175847 A1 8/2005 Luten, III
2015/0103639 A1 4/2015 Portet et al.
(Continued)

FOREIGN PATENT DOCUMENTS

CH 708746 4/2015
CH 710889 9/2016
(Continued)

OTHER PUBLICATIONS

International Search Report for PCT/IB2020/056500 dated Oct. 1, 2020, 6 pages.
(Continued)

*Primary Examiner* — James C Goloboy
(74) *Attorney, Agent, or Firm* — NIXON & VANDERHYE

(57) ABSTRACT

Disclosed is a timepiece assembly including at least two elements in contact and mobile relative to each other, one of the elements having at least a first contact surface intended to rub against at least a second contact surface of the other element under dry lubrication conditions. At least one of the first and second contact surfaces is covered with a hydrophobic coating having an angle of contact with water greater than 90°, preferably greater than 100° and preferably greater than 110°, and a coefficient of friction lower than 0.15, preferably lower than 0.12 and preferably lower than 0.1, the variation in the coefficient of friction as a function of the relative humidity being lower than 25%, preferably lower than 10% and preferably lower than 5%.

20 Claims, 1 Drawing Sheet

(52) U.S. Cl.
CPC ..... *C10M 2227/04* (2013.01); *C10N 2030/06* (2013.01); *C10N 2040/06* (2013.01); *C10N 2050/023* (2020.05)

(56) References Cited

U.S. PATENT DOCUMENTS

| | | | | |
|---|---|---|---|---|
| 2018/0171152 | A1 | 6/2018 | Frauenrath et al. | |
| 2020/0096943 | A1* | 3/2020 | Huot-Marchand | C07F 7/12 |

FOREIGN PATENT DOCUMENTS

| | | | | | |
|---|---|---|---|---|---|
| CH | 711836 | | 5/2017 | | |
| CH | 713671 | | 10/2018 | | |
| CN | 107686982 | A | 2/2018 | | |
| EP | 0 732 635 | A1 | 9/1996 | | |
| EP | 1 422 436 | | 5/2004 | | |
| EP | 3 006 605 | | 4/2016 | | |
| WO | 2008/017721 | A2 | 2/2008 | | |
| WO | 2010/142602 | | 12/2010 | | |
| WO | WO-2010142602 | A1 | * | 12/2010 | B81B 3/0008 |
| WO | 2013/079939 | A2 | 6/2013 | | |
| WO | 2013/167624 | | 11/2013 | | |
| WO | WO-2013167624 | A1 | * | 11/2013 | B05D 1/185 |

OTHER PUBLICATIONS

Written Opinion of the ISA for PCT/IB2020/056500 dated Oct. 1, 2020, 8 pages.
Office Action issued in Chinese Patent Application No. 202080038972.3 dated Jul. 20, 2023.

* cited by examiner

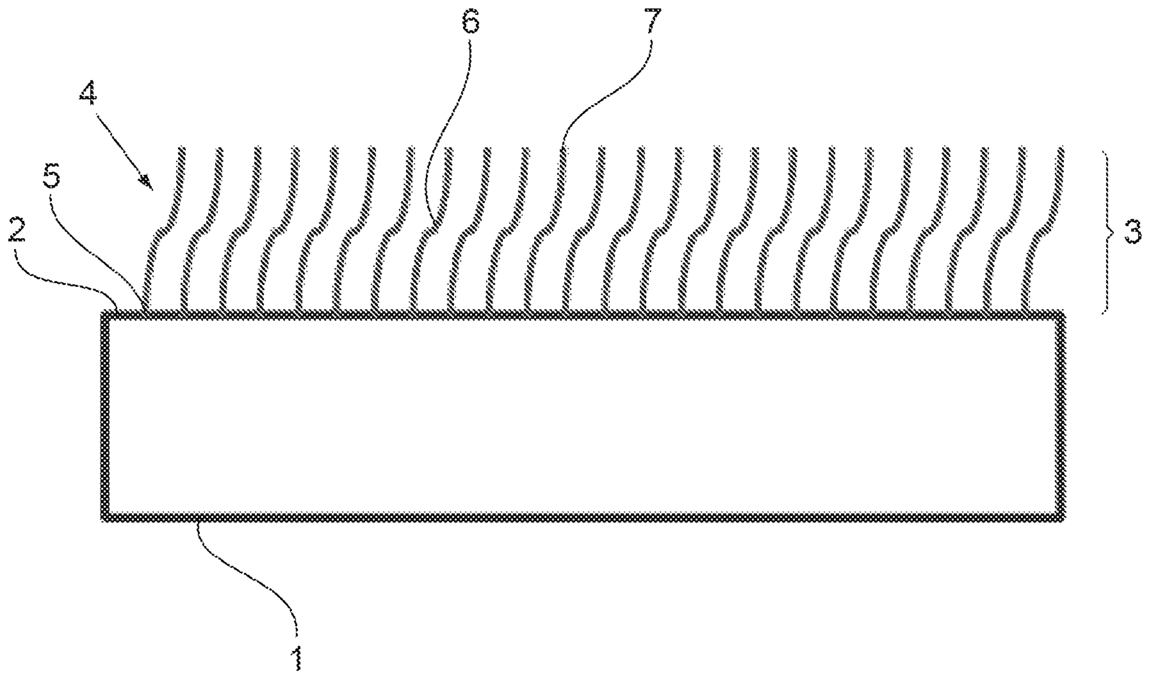
6
7
4
5
2
3
1

TIMEPIECE ASSEMBLY WITH AT LEAST TWO ELEMENTS IN CONTACT

This application is the U.S. national phase of International Application No. PCT/IB2020/056500 filed Jul. 10, 2020 which designated the U.S. and claims priority to EP Patent Application No. 19185385.2 filed Jul. 10, 2019, the entire contents of each of which are hereby incorporated by reference.

BACKGROUND OF THE INVENTION

Field of the Invention

The present invention relates to a timepiece assembly comprising at least two elements in contact and mobile relative to each other, one of said elements having at least a first contact surface intended to rub against at least a second contact surface of the other element under dry lubrication conditions. The present invention also relates to a timepiece comprising such a timepiece assembly.

In such a timepiece assembly, the rubbing of the two elements against each other will generate energy losses and wear between the two elements, which are prejudicial to the good operation of the timepiece assembly over the long term.

Description of the Related Art

In order to solve this problem which is well known to the horologist, the most common solution consists of working under "wet" lubrication conditions using a liquid or pasty lubricant in the form of e.g. an oil or a grease. Commercially available oils make it possible to achieve friction coefficients less than 0.1, which makes it possible to limit the energy losses and the wear on the elements. For example, the oil 9010 sold by Moebius is known. However, liquid or pasty lubricants have various disadvantages: they generally necessitate the use of an epilame in order not to migrate outside the contact surfaces, they have a soiling effect, are sensitive to aging and impose the need for regular maintenance.

Solutions have thus been proposed for working under dry lubrication or auto-lubrication conditions, i.e. without the addition of liquid or pasty lubricant or of any other fluid agent such as a solvent. For example, the use of a layer of $MoS_2$ deposited by a physical vapour deposition (PVD) has been proposed. However, the tribological properties (friction, wear) of such a layer degrade with humidity. Patent EP 732 635 describes e.g. the use of a crystallised carbon coating in the form of diamond or amorphous carbon (DLC) deposited on a silicon-based pallet. Other oxide-based, nitride-based or silicon carbide-based coatings have been tested. However, as shown by patent application CH 713 671, published 15 Oct. 2018, none of these coatings has proved satisfactory on a tribological level. Patent application CH 713 671 thus proposes returning to lubrication using oil or grease.

It thus appears that at the present time there is no solution permitting two elements of a timepiece assembly to be made to work under dry lubrication conditions while preserving the tribological properties (friction, wear) obtained with conventional lubrication.

SUMMARY OF THE INVENTION

The present invention aims to overcome this problem by proposing a solution permitting two elements of a timepiece assembly to be made to work under dry lubrication conditions and results to be obtained in terms of tribological properties, and thus in terms of chronometric performance, at least equivalent to those obtained with a standard lubrication oil.

To this end, the present invention relates to a timepiece assembly comprising at least two elements in contact and mobile relative to each other, one of said elements having at least a first contact surface intended to rub against at least a second contact surface of the other element under dry lubrication conditions.

According to the invention, at least one of said first and second contact surfaces is covered with a hydrophobic coating having an angle of contact with water greater than 90° and a coefficient of friction lower than 0.15, the variation in said coefficient of friction as a function of the relative humidity being lower than 25%, preferably lower than 10% and preferably lower than 5%.

Not wishing to be bound by theory, such a hydrophobic coating permits water routinely present on the surface of the elements of the timepiece assembly, and which has a detrimental effect on good operation, to be driven off. The hydrophobic coating proposed by the invention makes it possible to create an effective physical barrier against ambient humidity, protecting the contact surfaces from interactions with water present in the atmosphere, and thus to reduce friction and wear.

The present invention also relates to a timepiece comprising such a timepiece assembly.

BRIEF DESCRIPTION OF THE DRAWING

Other features and advantages of the present invention will become clear upon reading the following detailed description of the invention given by way of non-limiting example and made with reference to the attached drawings in which:

The sole drawing FIGURE illustrates a schematic view of a contact surface of an element of a timepiece assembly of the invention.

DESCRIPTION OF THE PREFERRED EMBODIMENTS

With reference to the drawing FIGURE, a timepiece assembly in accordance with the present invention comprises at least two elements 1 in contact and mobile relative to each other, one of said elements having a first contact surface 2 intended to rub against a second contact surface of the other element under dry lubrication conditions (i.e. under auto-lubrication conditions without the addition of a lubrication agent, in particular a liquid or pasty one such as an oil, a grease or a solvent).

In accordance with the invention, at least one of said first and second contact surfaces 2 is covered by a hydrophobic coating 3 having an angle of contact with water greater than 90°, preferably greater than 95° and more preferably greater than 98°.

In a particularly preferred manner, said hydrophobic coating 3 has an angle of contact with water greater than 100°, preferably greater than 105° and more preferably greater than 110°.

The angle of contact with water can be measured by any technique known to a person skilled in the art and in particular by the so-called "sessile drop method". According to this method, the angle of contact with water is measured by depositing a drop of water on the surface of the hydrophobic coating 3. The angle of contact is the angle between the tangent to the drop of water at the point of contact and the surface of the coating. It can be measured e.g. by a goniometer.

Furthermore, said hydrophobic coating 3 has a coefficient of friction lower than 0.15, preferably lower than 0.12, preferably lower than 0.1, and more preferably lower than 0.07, the variation in said coefficient of friction as a function of the relative humidity being lower than 25%, preferably lower than 10% and preferably lower than 5%. In a particularly advantageous manner, this coefficient of friction is substantially constant no matter the relative humidity of the air in which the timepiece assembly is placed.

The coefficient of friction is measured e.g. using a ball tribometer with a glass ball with a 5 mm diameter, rubbing against a flat sample corresponding to an element of the invention. The speed is 2 cm/s with a Hertz stress of 200 MPa under normal temperature conditions (20° C. to 22° C.) with a level of relative humidity of 20% to 50%.

As far as wear is concerned, an element of the invention comprising a silicon substrate covered with a layer of silicon dioxide and having a contact surface covered with the hydrophobic coating defined above undergoes less wear than a simple silicon substrate covered with an untreated silicon dioxide layer, with a level of relative humidity greater than 50%.

Preferably, at least the element which has its contact surface 2 covered with the hydrophobic coating 3 comprises a substrate produced from a material selected from the group comprising silicon, ceramics, glasses, silicon dioxides, aluminium oxides, such as ruby, titanium oxides, metallic alloys such as NiP, and metallic glasses.

If required, at least one intermediate anchoring layer can be provided between the substrate of at least the element which has its contact surface 2 covered with the hydrophobic coating 3 and said hydrophobic coating 3, in order to improve the quality of the deposition of the hydrophobic coating 3 on the contact surface 2.

Preferably, the intermediate anchoring layer is produced from a material chosen from the group comprising silicon, silicon dioxide, oxidised ceramics such as $Al_2O_3$, non-oxidised ceramics such as SiC, $Si_3N_4$, metals such as gold, titanium, copper and alloys of said metals. The material of the anchoring layer is advantageously selected according to the material of the substrate.

The anchoring layer can be e.g. deposited on the substrate by a flash method.

In a particularly preferred manner, at least the element with its contact surface 2 covered with the hydrophobic coating 3 is silicon-based. This means that it can be produced entirely of (monocrystalline or polycrystalline, doped or non-doped) silicon or mainly produced of silicon. For example, it can be composite and comprise a substrate of silicon covered with a layer of silicon dioxide which is naturally occurring or formed on the silicon e.g. by thermal oxidation as described in EP 1422436.

Depending on the applications chosen, one or both elements of the timepiece assembly can be produced from the materials defined above. A person skilled in the art knows how to choose pairs of materials which are suitable according to the applications.

The hydrophobic coating 3 advantageously has a thickness between 1 and 33 nm, preferably lower than 15 nm and more preferably lower than 5 nm. In a particularly preferred manner, the hydrophobic coating 3 has a thickness lower than 3 nm.

The hydrophobic coating 3 advantageously has an adhesion strength lower than 10 nN and preferably lower than 6 nN. The measurements can be made using an atomic force microscope (AFM) fitted with $Si_3N_4$ tips, under normal temperature and load conditions, with a level of relative humidity of 25% to 30%.

The hydrophobic coating 3 advantageously has a modulus of elasticity lower than 10 GPa and preferably lower than 5 GPa. The measurements can be effected using an atomic force microscope (AFM).

In a particularly preferred manner, the hydrophobic coating 3 is bonded to one of said first and second contact surfaces 2 at least by covalent bonds ensuring the chemical grafting of the hydrophobic coating 3 to the contact surface 2. The obligatory presence of these covalent bonds does not exclude the existence of simple physical interactions such as Van der Waals interactions or hydrogen bond type interactions between the hydrophobic coating 3 and the contact surface 2.

The hydrophobic coating 3 preferably comprises at least a first layer formed by at least one assembly of molecules 4 comprising a head 5, a separation chain 6 and a terminal group 7, at least a part of the heads 5 of the molecules 4 being bonded to said one of the first and second contact surfaces 2 by covalent bonds, and the separation chains 6 being arranged substantially parallel to each other and orientated substantially perpendicular to said one of the first and second contact surfaces 2.

According to a first embodiment of the invention, the hydrophobic coating 3 comprises a single layer corresponding to the first layer described above, the terminal group 7 being a non-polar group. This non-polar group is preferably —$CH_3$ or —$CF_3$, and more preferably —$CH_3$.

In a particularly advantageous manner, the heads 5 of the molecules 4 are mainly, and preferably essentially, cross-linked with each other in order to form the most continuous film possible over the contact surface 2. The heads 5 also bonded to the contact surface 2 by covalent bond form a three-dimensional network.

The assembly of molecules 4 as defined above constitutes a hydrophobic barrier. Any interaction between the contact surface 2 of the element 1 of the timepiece assembly and water is thus prevented.

The level of coverage (measured e.g. by indirect XPS measurement, a photoelectron spectroscopy method) of said one of the first and second contact surfaces 2 by the molecules 4 is preferably at least 80%, preferably at least 95% and more preferably at least 99%. Thus, the maximum quantity of water present on the surface of the contact surface 2 is at most 20%, preferably less than or equal to 5% and more preferably less than 1%.

In an advantageous manner, the molecules 4 are derived from organosilane precursors comprising a head 5 having at least one hydrolysable polar group, permitting the molecules 4 to be bonded to the active —OH sites on the contact surface 2 by siloxane Si—O—Si covalent bonds between the $Si/SiO_2$ surface of the element 1 and the organosilane-derived molecules 4.

In an advantageous manner the contact surface 2 is extremely rich in active—OH sites. It preferably comprises active —OH sites at a density greater than $10^{14}$OH sites/$cm^2$. To this end, the contact surface 2 may be subjected—prior to the deposition of the hydrophobic coating 3-to a surface hydroxylation treatment e.g. by a plasma method. Such a hydroxylation method is known to a person skilled in the art. A first step of cleaning the surface of the element to be treated followed by drying can be carried out before the hydroxylation treatment.

In a particularly preferred manner, the molecules 4 are derived from organosilane precursors comprising a head 5 having at least two, and preferably three, hydrolysable polar groups in order, on the one hand, to form the covalent bonds with the contact surface 2 and, on the other hand, to provide cross-linking between the heads 5 of the molecules 4 in order to form a substantially continuous film over the contact surface 2.

The hydrolysable groups can be different or identical. They can advantageously be chosen from the group comprising the —Cl and —OR groups where R is preferably Me or Et. The hydrolysable groups are preferably identical.

In an advantageous manner, the separation chains 6 are linear, preferably $C_7$-$C_{29}$, preferably $C_{11}$-$C_{29}$ and more preferably $C_{11}$-$C_{17}$, unsubstituted alkyl or fluoroalkyl chains.

The separation chains 6 are preferably linear —$(CH_2)_n$—, preferably $C_7$-$C_{29}$, preferably $C_{11}$-$C_{29}$ and more preferably $C_{11}$-$C_{19}$, unsubstituted alkyl chains. In a particularly preferred manner, the separation chains 6 are linear $C_{11}$-$C_{17}$ unsubstituted alkyl chains. The terminal group 7 bonded to these separation chains is preferably —$CH_3$. A —$(CH_2)_{17}$— separation chain is particularly preferred, in particular with a —$CH_3$ terminal group so that a full octadecyl chain bonded to the head 5 of the molecules 4 is particularly preferred. More particularly, a full octadecyl chain bonded to the silicon head 5 of the molecules 4 is particularly preferred.

According to another variant, the separation chains 6 are linear —$(CH_2)_x$—$(CF_2)_y$— fluoroalkyl chains where $x \geq 0$ and $y \geq 1$ with preferably $7 \leq x+y \leq 29$. Preferably x=0, 1, 2 and $11 \leq x+y \leq 29$, preferably $11 \leq x+y \leq 19$ and more preferably $11 \leq x+y \leq 17$. Preferably x=2 and $9 \leq y \leq 15$. A —$(CH_2)_2$—$(CF_2)_9$— separation chain is particularly preferred. In this case, the terminal group 7 is preferably —$CF_3$.

According to another variant. the separation chains 6 are aliphatic chains.

Thus, the molecules 4 are preferably derived from organosilane precursors chosen from the group comprising n-dodecyltrichlorosilane, n-dodecyltrimethoxysilane, n-dodecyltriethoxysilane, perfluorododecyltrichlorosilane, n-tridecyltrichlorosilane, n-tridecyltrimethoxysilane, n-tridecyltriethoxysilane, perfluorotridecyltrichlorosilane, n-tetradecyltrichlorosilane, n-tetradecyltrimethoxysilane, n-tetradecyltriethoxysilane, perfluorotetradecyltrichlorosilane, n-pentadecyltrichlorosilane, n-pentadecyltrimethoxysilane, n-pentadecyltriethoxysilane, perfluoropentadecyltrichlorosilane, n-hexadecyltrichlorosilane, n-hexadecyltrimethoxysilane, n-hexadecyltriethoxysilane, perfluorohexadecyltrichlorosilane, n-heptadecyltrichlorosilane, n-heptadecyltrimethoxysilane, n-heptadecyltriethoxysilane, perfluoroheptadecyltrichlorosilane, n-octadecyltrichlorosilane, n-octadecyltrimethoxysilane, n-octadecyltriethoxysilane and perfluorooctadecyltrichlorosilane.

The molecules 4 are preferably derived from n-octadecyltrichlorosilane or perfluorododecyltrichlorosilane. In a particularly preferred manner, the molecules 4 are derived from n-octadecyltrichlorosilane.

According to another embodiment of the invention, the hydrophobic coating 3 comprises at least a first layer and a second layer, the terminal group 7 of the molecules 4 of the first layer being a linkage group between the first layer and the second layer. This terminal linkage group 7 can be e.g. a chemically modifiable group such as a terminal —OH or $NH_2$ group.

The heads of the molecules of the first layer are similar to those used for the single layer of the first embodiment described above.

The separation chains of the first layer are linear —$(CH_2)_n$— unsubstituted alkyl chains of the same type as those used for the single layer of the first embodiment described above. However, they can be shorter, e.g. $C_2$-$C_3$.

Thus, the molecules of the first layer can be derived from organosilane precursors chosen from the group comprising 3-aminopropyltriethoxysilane and 1,2-bis(triethoxysilyl) ethane.

In an advantageous manner, the second layer comprises molecules having a head bonded to the terminal group of the molecule of the first layer, preferably essentially by covalent bonds, a separation chain and a non-polar terminal group, the separation chains being arranged substantially parallel to each other and orientated substantially perpendicularly to said one of the first and second contact surfaces.

The separation chains of the second layer are linear —$(CH_2)_n$— unsubstituted alkyl chains of the same type as those used for the single layer of the first embodiment described above (preferably $C_{12}$-$C_{18}$ chains). The non-polar terminal group of the second layer is of the same type as that used for the single layer of the first embodiment described above (preferably —$CH_3$ or —$CF_3$ and more preferably —$CH_3$).

Thus, the molecules of the second layer can be derived from precursors chosen from the group comprising n-octadecyltrichlorosilane and stearic acid The hydrophobic coating can comprise at least a third layer. This third layer can be added by grafting molecules onto the second layer in a manner similar to the grafting of the second layer onto the first layer. The molecules of the third layer will be chosen in a similar manner to the molecules of the second layer described above in order that the coating obtained has the required hydrophobicity and tribology properties.

In a particularly advantageous manner, the assembly of the molecules of the first layer of the hydrophobic coating 3 is a monolayer self-assembled on the contact surface 2. This type of assembly is known as SAM (self-assembled monolayer). This monolayer is formed spontaneously by adsorption on the surface of the contact surface. It can be deposited on the contact surface 2 by in-solution techniques or by vapour deposition. The liquid phase method can be carried out by any impregnation method such as dip-coating, spin-coating, spray-coating, etc. The vapour phase method can be carried out e.g. by a chemical vapour deposition (CVD) method. The quality of the deposition can be improved by heating followed by rinsing.

Such methods for deposition of SAMs are well known to a person skilled in the art and do not require more detailed description. However, it is stated that a person skilled in the art must choose the parameters for the method so as to obtain a hydrophobic coating having the features described above. In particular, the concentration of precursors, the reaction temperature, the duration of reaction will be chosen so as to obtain a dense, homogeneous SAM making it possible to obtain a coating having the hydrophobicity and tribology properties required to obtain the desired auto-lubricating effect.

It is very obvious that the hydrophobic coating 3 can be deposited on the contact surface of at least one of the elements of the timepiece assembly by any suitable grafting method known to a person skilled in the art.

The elements of the timepiece assembly can be treated directly after they are manufactured (e.g. by DRIE (deep reactive ion etching), followed by the treatment step to form the silicon dioxide layer) in order to deposit the hydrophobic coating 3. The treated elements of the timepiece assembly can then be mounted without requiring a washing step.

The contact surface 2 can be smooth or have a certain roughness.

According to one particularly advantageous embodiment, the contact surface 2 can have a roughness Ra (average arithmetic roughness) of at least 2 nm and preferably at least 5 nm.

The roughness measurements can be carried out using an atomic force microscope (AFM).

The roughness preferably required for the contact surface 2 can be obtained directly by the manufacture of the elements of the timepiece assembly by a standard DRIE method, by scalloping and any other surface-texturing method known to a person skilled in the art.

The suitable roughness can also be obtained using elements of the timepiece assembly, of which the edges which are cut out to act as a contact surface have a ribbed surface comprising an alternating arrangement of ribs and troughs, the ribs and troughs being straight and forming a staggered pattern comprising a plurality of first intervals in which the spacing separating the ribs from each other is equal to a first distance, and at least one second interval in which the spacing between the ribs is equal to a second distance different from the first distance, the first distance being between 200 nm and 5 μm. Such surface texturing as well as its method of production are described in application EP 18155609 incorporated by reference into the present description.

The suitable roughness can also be obtained using elements of the timepiece assembly obtained by a method of texturing a silicon surface which comprises the following steps:

a) producing an apertured etching mask on the silicon surface so as to expose certain locations on the surface to be textured according to the morphology of the desired surface;

b) depositing a sacrificial resin layer on the exposed locations of the surface and on the etching mask, the sacrificial layer being produced without either exposure nor curing of the resin;

c) attacking the sacrificial resin layer by deep reactive ion etching (DRIE), continuing step c) long enough to transfer the inhomogeneities of the sacrificial layer to the extent of the silicon surface to be textured so that said extent is roughened according to the desired morphology.

Step c) is preferably implemented by allowing the temperature of the silicon surface to rise to the point where the sacrificial layer cures until it is totally consumed.

Step c) advantageously comprises the following sub-steps:

i. attacking by reactive ion etching the sacrificial layer and/or the silicon surface through the apertures in the mask so as to hollow out the sacrificial layer and/or the silicon surface;

ii. depositing a chemically inert passivation layer on the surfaces exposed by the etching during the previous step;

iii. attaching by reactive ion etching the passivation layer through the apertures in the mask so as to expose the sacrificial layer and/or the silicon surface at the bottom of the hollows deepened during the previous sub-step (i);

iv. repeating execution of a sequence of sub-steps comprising steps (i), (ii) and (iii) until the end of step c).

Such a texturing method is described in application EP 19185364 of the applicant, incorporated by reference into the present description.

Only the contact surfaces of at least one of the elements of the timepiece assembly can be covered by the hydrophobic coating 3. The contact surfaces of the two elements of the timepiece assembly which are intended to rub against each other are preferably covered by the hydrophobic coating 3. It is also possible to cover the whole of the surface of the elements of the timepiece assembly with the hydrophobic coating 3 if it is desired to simplify the manufacturing process.

The hydrophobic coating 3 can be deposited on any contact surface intended to rub against another contact surface of an element of a timepiece assembly.

For example, said timepiece assembly can constitute an escapement comprising an escapement wheel and a pallet, one of the elements being the escapement wheel and the other being the pallet. More particularly, one of the first and second contact surfaces can belong to at least one of the teeth of the escapement wheel, the other of said first and second contact surfaces belonging to an entry pallet stone or to an exit pallet stone of the pallet.

In particular, at least one of said first and second contact surfaces covered with the hydrophobic coating 3 can be chosen from the group comprising the locking plane, the impulse plane, the locking beak, the impulse beak of at least one of the teeth of the escapement wheel, the locking plane, the impulse plane, the locking beak and the impulse beak of the entry pallet stone or the exit pallet stone of the pallet, the locking plane, the impulse plane, the locking beak and the impulse beak of the exit pallet stone of the pallet.

When one of the contact surfaces listed above is covered with the hydrophobic coating 3, the corresponding contact surface intended to rub against it is preferably also covered with said hydrophobic coating 3.

The timepiece assembly of the invention can also constitute an escapement comprising a pallet having a guard pin and a plate, one of the elements being the guard pin and the other being the plate.

The timepiece assembly of the invention can also constitute a balance pivot arrangement, one of the elements being the shaft of the balance and the other being its pivot.

The following example illustrates the present invention but without limiting its scope.

The escapement wheel and the pallet of a Swiss lever escapement produced from silicon covered by a silicon dioxide layer and produced by DRIE were subjected to a plasma treatment and then covered by a self-assembled monolayer of n-octadecyltrichlorosilane deposited by dip-coating so as to obtain a homogeneous monolayer.

This escapement is used in a movement under dry lubrication conditions in accordance with the invention. The average amplitude is measured in 6 positions, the piece being at 0 h, in the initial state and over the long term.

The same tests are carried out with the same escapement but under wet lubrication conditions, the escapement being lubricated in a conventional manner using the Moebius 9010 oil.

The measurements show that the escapement in accordance with the invention makes it possible to obtain amplitudes at least equivalent, or even superior, to those obtained with the escapement lubricated in the conventional manner. The escapement under dry lubrication in accordance with the invention makes it possible to obtain results in terms of chronometric performance and thus in terms of tribological properties at least equivalent to those obtained with a standard lubrication oil, without the disadvantages linked to the use of a lubricant.

The invention claimed is:

1. A timepiece assembly comprising at least two elements in contact and mobile relative to each other, one of said elements having at least a first contact surface intended to rub against at least a second contact surface of the other element under dry lubrication conditions, wherein at least one of said first and second contact surfaces is covered with a hydrophobic coating having an angle of contact with water greater than 90°, and a coefficient of friction lower than 0.15, the variation in said coefficient of friction as a function of the relative humidity being lower than 25%,
   wherein the hydrophobic coating is bonded to one of said first and second contact surfaces at least by covalent bonds,
   wherein said one of the first and second contact surfaces comprises active —OH sites at a density greater than $10^{14}$ OH sites/$cm^2$, the second contact surface having subjected, prior to the deposition of the hydrophobic coating, to a surface hydroxylation treatment.

2. The timepiece assembly as claimed in claim 1, wherein the hydrophobic coating has a thickness between 1 and 30 nm.

3. The timepiece assembly as claimed in claim 1, wherein the hydrophobic coating has an adhesion strength lower than 10 nN and preferably lower than 6 nN.

4. The timepiece assembly as claimed in claim 1, wherein the hydrophobic coating has a modulus of elasticity lower than 10 GPa.

5. The timepiece assembly as claimed in claim 1, wherein the hydrophobic coating comprises at least a first layer formed by at least one assembly of molecules comprising a head, a separation chain and a terminal group, at least a part of the heads of the molecules being bonded to said one of the first and second contact surfaces by covalent bonds, and the separation chains being arranged substantially parallel to each other and orientated substantially perpendicular to said one of the first and second contact surfaces.

6. The timepiece assembly as claimed in claim 5, wherein the molecules are derived from organosilane precursors comprising a head.

7. The timepiece assembly as claimed in claim 5, wherein the separation chains are linear, unsubstituted alkyl or fluoroalkyl chains.

8. The timepiece assembly as claimed in claim 5, wherein the hydrophobic coating comprises a single layer, the terminal group being a non-polar group.

9. The timepiece assembly as claimed in claim 5, wherein the molecules are derived from organosilane precursors chosen from the group consisting of n-dodecyltrichlorosilane, n-dodecyltrimethoxysilane, n-dodecyltriethoxysilane, perfluorododecyltrichlorosilane, n-tridecyltrichlorosilane, n-tridecyltrimethoxysilane, n-tridecyltriethoxysilane, perfluorotridecyltrichlorosilane, n-tetradecyltrichlorosilane, n-tetradecyltrimethoxysilane, n-tetradecyltriethoxysilane, perfluorotetradecyltrichlorosilane, n-pentadecyltrichlorosilane, n-pentadecyltrimethoxysilane, n-pentadecyltriethoxysilane, perfluoropentadecyltrichlorosilane, n-hexadecyltrichlorosilane, n-hexadecyltrimethoxysilane, n-hexadecyltriethoxysilane, perfluorohexadecyltrichlorosilane, n-heptadecyltrichlorosilane, n-heptadecyltrimethoxysilane, n-heptadecyltriethoxysilane, perfluoroheptadecyltrichlorosilane, n-octadecyltrichlorosilane, n-octadecyltrimethoxysilane, n-octadecyltriethoxysilane and perfluorooctadecyltrichlorosilane.

10. The timepiece assembly as claimed in claim 5, wherein the hydrophobic coating comprises at least a first layer and a second layer, the terminal group of the molecules of the first layer being a linkage group between the first layer and the second layer.

11. The timepiece assembly as claimed in claim 10, wherein the second layer comprises molecules having a head bonded to the terminal group of the molecule of the first layer, a separation chain and a non-polar terminal group, the separation chains being arranged substantially parallel to each other and orientated substantially perpendicularly to said one of the first and second contact surfaces.

12. The timepiece assembly as claimed in claim 5, wherein the assembly of the molecules of the first layer is a monolayer self-assembled on said one of the first and second contact surfaces.

13. The timepiece assembly as claimed in claim 1, wherein at least the element which has its contact surface covered with the hydrophobic coating comprises a substrate produced from a material selected from the group comprising silicon, ceramics, glasses, silicon dioxides, aluminium oxides, titanium oxides, metallic alloys and metallic glasses.

14. The timepiece assembly as claimed in claim 1, wherein said one of the first and second contact surfaces have a roughness Ra of at least 2 nm.

15. The timepiece assembly as claimed in claim 1, further comprising an escapement.

16. A timepiece comprising a timepiece assembly as claimed in claim 1.

17. The timepiece assembly of claim 1, wherein the hydrophobic coating has an angle of contact with water greater than 100°, and a coefficient of friction lower than 0.12, the variation in said coefficient of friction as a function of the relative humidity being lower than 10%.

18. The timepiece assembly as claimed in claim 1, wherein the hydrophobic coating has a thickness lower than 15 nm.

19. A timepiece assembly comprising at least two elements in contact and mobile relative to each other, one of said elements having at least a first contact surface intended to rub against at least a second contact surface of the other element under dry lubrication conditions, wherein at least one of said first and second contact surfaces is covered with a hydrophobic coating having an angle of contact with water greater than 90°, and a coefficient of friction lower than 0.15, the variation in said coefficient of friction as a function of the relative humidity being lower than 25%,
   wherein the hydrophobic coating is bonded to one of said first and second contact surfaces at least by covalent bonds,
   wherein the hydrophobic coating comprises at least a first layer formed by at least one assembly of molecules comprising a head, a separation chain and a terminal group, at least a part of the heads of the molecules being bonded to said one of the first and second contact surfaces by covalent bonds, and the separation chains being arranged substantially parallel to each other and orientated substantially perpendicular to said one of the first and second contact surfaces, and
   wherein the hydrophobic coating comprises at least a first layer and a second layer, the terminal group of the molecules of the first layer being a linkage group between the first layer and the second layer.

20. A timepiece assembly comprising at least two elements in contact and mobile relative to each other, one of said elements having at least a first contact surface intended to rub against at least a second contact surface of the other element under dry lubrication conditions, wherein at least one of said first and second contact surfaces is covered with a hydrophobic coating having an angle of contact with water greater than 90°, and a coefficient of friction lower than 0.15, the variation in said coefficient of friction as a function of the relative humidity being lower than 25%, wherein the hydrophobic coating is bonded to one of said first and second contact surfaces at least by covalent bonds, wherein the hydrophobic coating comprises at least a first layer formed by at least one assembly of molecules comprising a head, a separation chain and a terminal group, at least a part of the heads of the molecules being bonded to said one of the first and second contact surfaces by covalent bonds, and the separation chains being arranged substantially parallel to each other and orientated substantially perpendicular to said one of the first and second contact surfaces, and wherein the hydrophobic coating comprises at least a first layer and second layer, wherein the second layer comprises molecules having a head bonded to the terminal group of the molecule of the first layer, a separation chain and a non-polar terminal group, the separation chains being arranged substantially parallel to each other and orientated substantially perpendicularly to said one of the first and second contact surfaces.

* * * * *